(12) United States Patent
Furusawa et al.

(10) Patent No.: US 7,481,538 B2
(45) Date of Patent: Jan. 27, 2009

(54) ILLUMINATOR AND PROJECTOR

(75) Inventors: Makoto Furusawa, Suwa (JP); Akira Hashimoto, Suwa (JP); Toru Kurihara, Suwa (JP); Hiroyuki Shindo, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 357 days.

(21) Appl. No.: 11/428,461

(22) Filed: Jul. 3, 2006

(65) Prior Publication Data
US 2007/0002280 A1    Jan. 4, 2007

(30) Foreign Application Priority Data
Jul. 4, 2005   (JP) ............... 2005-194643

(51) Int. Cl.
*G03B 21/14* (2006.01)
(52) U.S. Cl. ............ 353/20; 353/94; 362/561; 362/234; 385/901
(58) Field of Classification Search ........... 353/20, 353/94, 31, 34; 359/483–501; 349/5, 7, 349/8, 9
See application file for complete search history.

(56) References Cited

U.S. PATENT DOCUMENTS

| | | | | |
|---|---|---|---|---|
| 6,587,269 B2* | 7/2003 | Li | ............... | 359/497 |
| 6,698,891 B2* | 3/2004 | Kato | ............... | 353/20 |
| 6,796,655 B2* | 9/2004 | Seki | ............... | 353/20 |
| 7,281,806 B2* | 10/2007 | O'Donnell et al. | ............ | 353/94 |
| 7,325,957 B2* | 2/2008 | Morejon et al. | ............ | 362/555 |
| 7,360,900 B2* | 4/2008 | Sakata et al. | ............ | 353/20 |
| 2003/0193649 A1 | 10/2003 | Seki | | |
| 2005/0134825 A1 | 6/2005 | Schuster | | |
| 2006/0119802 A1* | 6/2006 | Akiyama | ............ | 353/94 |
| 2007/0165185 A1* | 7/2007 | Chen | ............ | 353/20 |

FOREIGN PATENT DOCUMENTS

| | | |
|---|---|---|
| JP | A 2000-056266 | 2/2000 |
| JP | A 2000-131647 | 5/2000 |
| JP | A 2003-202523 | 7/2003 |
| JP | A-2003-302702 | 10/2003 |
| JP | A 2004-205665 | 7/2004 |
| WO | WO 03/098329 A1 | 11/2003 |

* cited by examiner

*Primary Examiner*—William C. Dowling
(74) *Attorney, Agent, or Firm*—Oliff & Berridge, PLC

(57) ABSTRACT

An illuminator includes a polarization converter that converts source light into first polarized light, a polarization separation member that separates the first polarized light of from the polarization converter and second polarized light different from the first polarized light, by reflection and transmission, a polarization switch member that reflects the first polarized light passed through the polarization separation member and changes same into the second polarized light, and a light guide having a first rod arranged between the polarization converter and the polarization separation member, a second rod arranged between the polarization separation member and the polarization switch member, and a third rod arranged on an optical path of the second polarized light separated by the polarization separation member.

8 Claims, 4 Drawing Sheets

ILLUMINATOR AND PROJECTOR

This application claims priority from Japanese Patent Application No. 2005-194643, filed in the Japanese Patent Office on Jul. 4, 2005, the entire disclosure of which is hereby incorporated by reference.

BACKGROUND

1. Technical Field

The present invention relates to an illuminator that provides illumination to a liquid-crystal light valve or other light modulator, and to a projector incorporating the same.

2. Related Art

As a first projector, there is an arrangement that the two polarized light components exiting from the polarization beam splitter opposed to a light-source lamp, are focused to one end of a rod integrator so that one of the polarized light components of the light exiting at the other end thereof, can pass a periodic point at which a retardation film is arranged, thereby obtaining a uniform, single polarized light component of illumination light (see JP-A-2000-56266, FIG. 1).

As a second projector, there is an arrangement that the source light emitting from a light-source lamp, is focused to one end of a rod integrator so that the light exiting at the other end is polarization-converted by a polarization converter made by a polarization beam splitter or the like, thereby obtaining a uniform, single polarized light component of illumination light (see JP-A-2000-56266, FIG. 14).

As a third projector, there is an arrangement that the source light of from a light-source lamp is focused to one end of a rod integrator through an aperture provided in the center of a reflection mirror, thereby obtaining a uniform, single polarized light component of illumination light through a polarization separation element provided on the other end thereof (see JP A 2003-202523). In this case, when turning back the reflection light from the polarization separation element by a reflection mirror, it is passed through the polarization separation element by changing the direction of polarization through use of a wavelength plate provided on the optical path.

However, in the first and second projectors, illumination light is made uniform by the rod integrator. For this reason, the target of uniformization cannot be achieved without increasing the length of the rod integrator, which tends to increase the size of the illuminator and its surrounding. Moreover, the first projector requires a retardation film arranged in a stripe form at a conjugate point to a light-incident end of the integrator. This makes it difficult to fabricate the illuminator and its surrounding, resulting in cost increase.

Meanwhile, in the third projector, uniformization is not sufficiently achieved for a nearly half component which first passed the polarization separation element.

SUMMARY

An advantage of some aspects of the invention is to provide a small-sized illuminator capable of radiating illumination light with high uniformity, and a projector using the same.

According to a first aspect of the invention, an illuminator comprises: (a) a polarization converter that converts source light into first polarized light; (b) a polarization separation member that separates the first polarized light of from the polarization converter and second polarized light different from the first polarized light, by reflection and transmission; (c) a polarization switch member that reflects the first polarized light passed through the polarization separation member and changes same into the second polarized light; and (d) a light guide having a first rod arranged between the polarization converter and the polarization separation member, a second rod arranged between the polarization separation member and the polarization switch member, and a third rod arranged on an optical path of the second polarized light separated by the polarization separation member.

In the illuminator, the first polarized light of from the polarization converter can be propagated in the first rod, the first polarized light passed through the polarization converter be turned back in the second rod, and the second polarized light separated by the polarization separation member be guided to the outside in the third rod. Accordingly, the light guide including the first to third rods can be accommodated in a comparatively narrow space, thus making it possible to provide a small-sized illuminator that light uniformization is achieved with a saved space.

It is preferable that the polarization converter and the polarization switch member are arranged, on a straight line, sandwiching the polarization separation member, the third rod extending in a direction orthogonal to the first and second rods arranged on a straight line from a position close to the polarization separation member. In this case, illumination light can be taken out of the third rod arranged in a manner to be branched from the polarization separation member sandwiched between the first and second rods on a straight line.

It is preferable that, the polarization converter and the polarization switch member are arranged in orthogonal directions to each other sandwiching the polarization separation member, the third rod extending in an extending direction of the second rod from a position close to the polarization separation member. In this case, illumination light can be taken out of the third rod arranged in a manner to be branched from the polarization separation member sandwiched between the first and second rods in an L form.

It is preferable that, of the invention, the polarization separation member is a polarization separation layer arranged inclining relative to an extending direction of the first rod, the polarization switch member having a mirror that causes a luminous flux corresponding to the first polarized light passed through the polarization separation layer to turn back within the second rod and retardation element that polarizes a luminous flux turning back within the second rod from the first polarized light into the second polarized light. In this case, source light can be turned back within the second rod member by merely arranging suitably a polarization separation layer, a mirror and a retardation element in a boundary or on an end of the first and second rods, thus making it possible to efficiently uniformizing the illumination light by a simple structure.

It is preferable that the polarization converter has a polarization separation layer that separates source light that is random polarized light into first and second polarized light, and a retardation element that regulates a polarization direction of the second polarized light with the first polarized light. In this case, source light can be made in a luminous flux having a single polarized light component.

According to a second aspect of the invention, a first illuminator comprises: (a) a first polarization converter that converts first source light into first polarized light; (b) a first polarization separation member that separates the first polarized light of from the first polarization converter and second polarized light different from the first polarized light, by reflection and transmission; (c) a first polarization switch member that reflects the first polarized light passed the first polarization separation member and changes same into the second polarized light; (d) a first light guide having a first rod arranged between the first polarization converter and the first polarization separation member, and a second rod arranged between the first polarization separation member and the first polarization switch member; (e) a second polarization converter that converts second source light into first polarized light; (f) a second polarization separation member that is arranged close to the first polarization switch member and for separating the first polarized light of from the second polarization converter and second polarized light different from the first polarized light, by reflection and transmission; (g) a second polarization switch member that reflects the first polarized light passed through the second polarization separation member and polarizes same into the second polarized light; (h) a second light guide having a third rod arranged between the second polarization converter and the second polarization separation member, and a fourth rod arranged between the second polarization separation member and the second polarization switch member; and (i) a fifth rod arranged on an optical path of the second polarized light separated by the first and second polarization separation member.

In this case, the illuminator allows the first polarized light of from the first polarization converter to propagate in the first rod, the first polarized light passed through the first polarization converter to turn back in the second rod, the first polarized light of from the second polarization converter to propagate in the third rod, and the first polarized light passed through the second polarization separation member to turn back in the fourth rod. In the fifth rod, the second polarized light separated by the first and second polarization separation members can be guided to the outside. Accordingly, the light guide, including the first and second light guide and the fifth rod, can be accommodated in a comparatively narrow space, thus making it possible to provide a small-sized illuminator that light uniformization is achieved with a saved space.

According to a third aspect of the invention, a projector according to the present invention comprises: (a) the illuminator of any of the above ones; (b) a light modulator that modulates illumination light of from the illuminator according to image information; and (c) a projection system that projects image light formed by the light modulator.

In this case, the projector uses an illuminator having the foregoing feature. Accordingly, a small-sized, inexpensive projector can be provided by an illuminator small in size and simple in structure in which uniformaization is to be achieved with a saved space.

According to a fourth aspect of the invention, a projector comprises: (a) the illuminators for respective colors of any of the above ones, that generates respective colors of light as illumination light; (b) light modulators for respective colors that modulate respective colors of light of from the illuminators, according to image information; (c) a light combining system that combines together respective colors of images modulated by the light modulators for respective colors and allows same to exit; and (d) a projection system that projects image light combined through the light combining system.

In this case, the projector uses illuminators having the foregoing feature. Accordingly, a small-sized, inexpensive projector can be provided by illuminators for respective colors that are small in size and simple in structure wherein uniformaization is to be achieved with a saved space.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
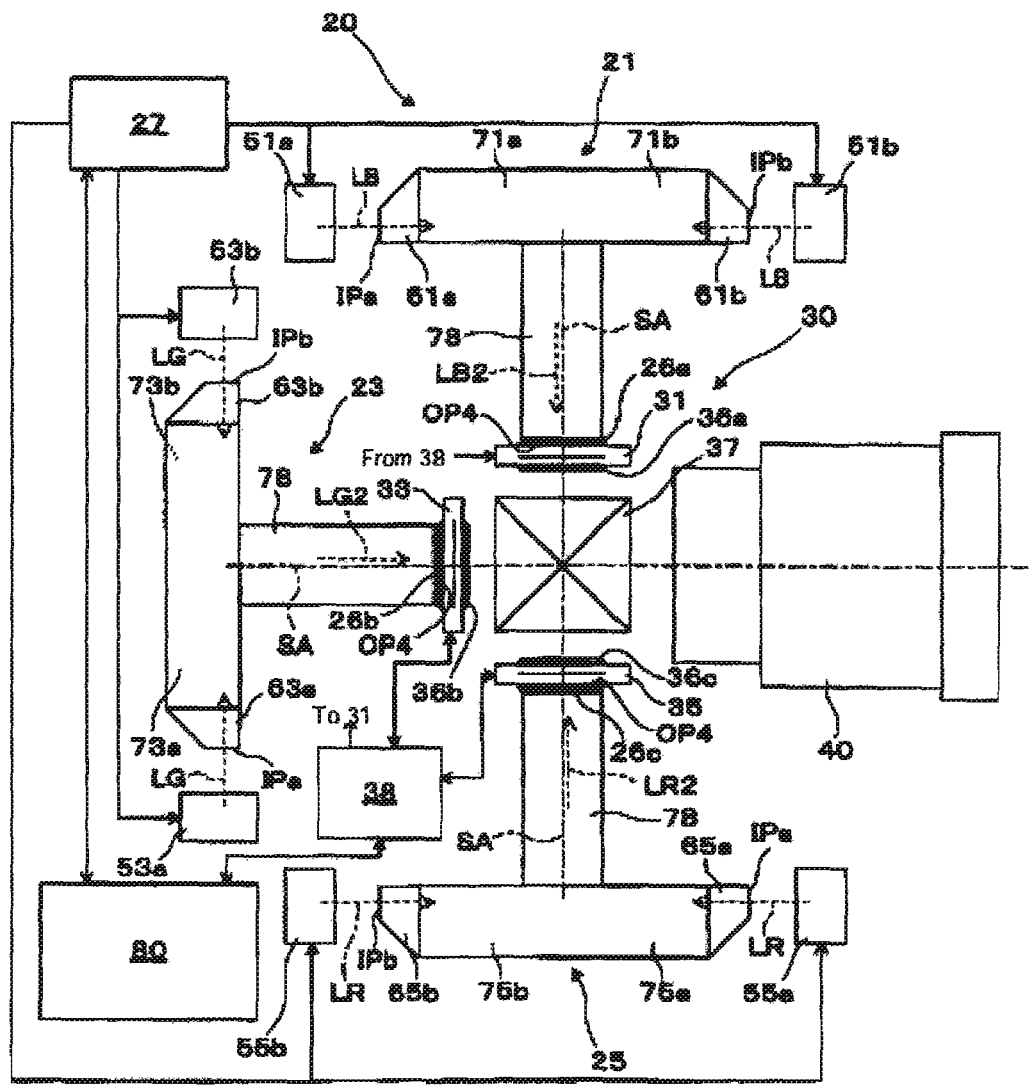
FIG. 1 is a block diagram conceptionally explaining a projector in a first embodiment.

FIG. 1 is a block diagram conceptionally explaining the construction of a projector according to a first embodiment incorporating therein an illuminator in the present invention.

The projector 10 has an illuminator section 20, a light-modulator section 30, a projection lens 40 and a control 80. The illuminator section 20 has a blue-light illuminator 21, a green-light illuminator 23, a red-light illuminator 25 and a light-source driver 27. The light-modulator section 30 has three liquid-crystal display panels 31, 33, 35 that are light modulators, a cross-dichroic prism 37 that is a light-combining system, and a device driver 38 for outputting a drive signal to the liquid-crystal display panels 31, 33, 35.

In the illuminator section 20, the blue-light illuminator 21 has a pair of blue-light source units 51a, 51b, a pair of polarization converters 61a, 61b, a pair of light guides 71a, 71b, and a combination rod 78. The blue-light source units 51a, 51b are blue-light sources that emit blue source light. The polarization converters 61a, 61b are blue-light polarization converters for converting blue source light into a particular polarized light component. The light guides 71a, 71b and the combination rod 78 are a blue-light uniformizer system for making uniform the blue source light.

Figure 2:
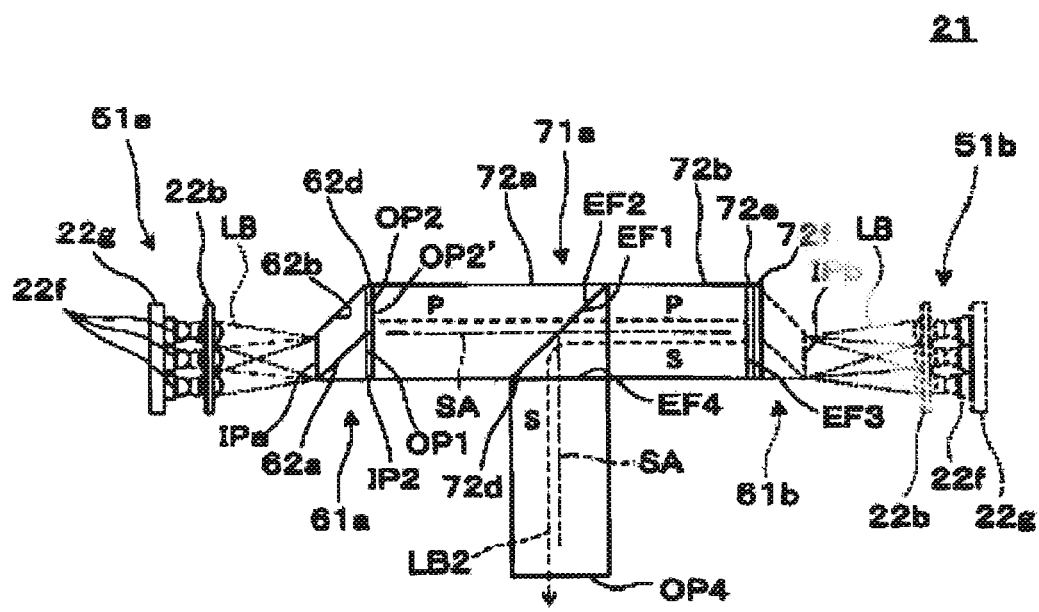
FIG. 2 is a plan view of a blue-light illuminator shown in FIG. 1.
Figure 3:
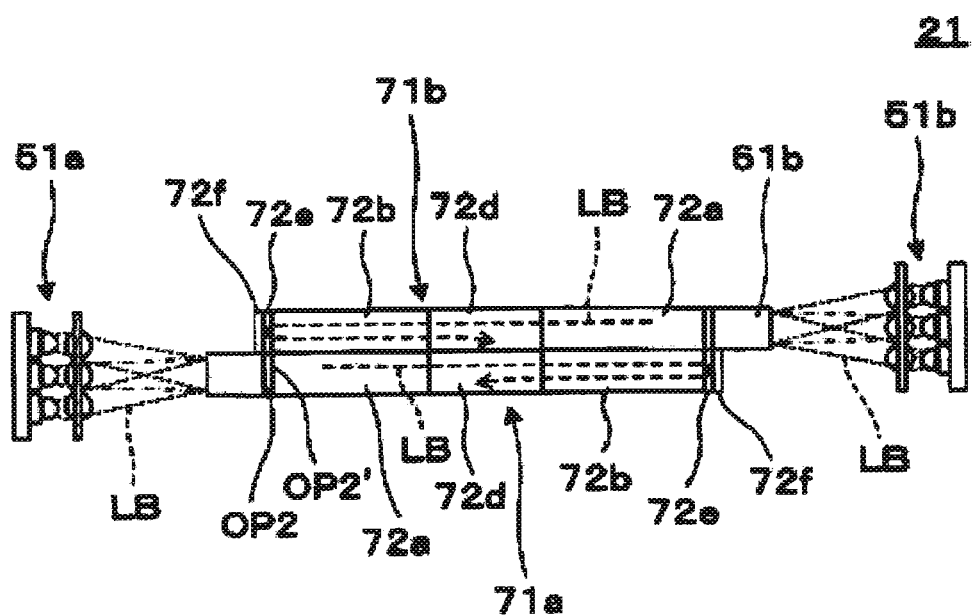
FIG. 3 is a side view of the blue-light illuminator shown in FIG. 1.

FIG. 2 is a plan view of the blue-light illuminator 21 shown in FIG. 1 while FIG. 3 is a side view of the blue-light illuminator 21.

In the blue-light illuminator 21, a first blue-light source unit 51a has a plurality of LEDs 22f, that are light-emitting elements called solid or semiconductor light sources, attached in a proper two-dimensional arrangement (e.g. in a matrix arrangement) on a circuit board 22g. In front of the LEDs 22f, there is provided a focus lens array 22b arranged with beam-shaping lens elements separately. Each of the LEDs 22f is to generate blue light included in the category of blue (B) of three primary colors. The blue light taken out of the LED 22f, i.e. first source light LB, passes the focus lens array 22b and then enters a first polarization converter 61a at its light-incident end, i.e. light-incident port IPa. On this occasion, the blue light from the LEDs 22f is suitably diverged by the lens elements constituting the focus lens array 22b and made into beams having elliptic or rectangular section to be collected to a predetermined point. Namely, the blue light from the LEDs 22f is wholly gathered onto a rectangular light-incident port IPa provided on the first polarization converter 61a. Thus, it in a superimposed state is incident upon the light-incident port IPa freely from leakage.

The second blue-light source unit 51b has the same structure as the first blue-light source unit 51a except for the difference in arrangement. Although the detail is omitted to explain, in the second blue-light source unit 51b, the blue light of from the LEDs 22f on the circuit board 22g is collected by the focus lens array 22b so that it can superimposedly enter the rectangular light-incident port IPb provided in the second polarization converter 61b freely from leakage.

The first polarization converter 61a is arranged on the exit side of and opposite to the first blue-light source unit 51a, to regulate the polarization direction of the first source light LB which entered at the light-incident port IPa. The first polarization converter 61a is formed by bonding a right-triangular prism and a parallelogram prism together, thus having a polarization separation layer 62a sandwiched between the both prisms, a reflection layer 62b formed opposite to the polarization separation layer 62a through the parallelogram prism, and a wavelength plate 62d arranged on the parallelogram prism close to the light guide 71a.

The polarization separation layer 62a and the reflection layer 62b are polarization separation members each formed by a dielectric multi-layer film on the respective slant surfaces of the prism due to evaporation. Those are arranged inclining 45 degrees relative to a system optical axis SA. The former polarization separation layer 62a allows a linearly polarized light component in a particular direction (e.g. P-polarized light) of random-polarized blue light from the first blue-light source unit 51a to be passed but reflects a linearly polarized light component in a direction orthogonal to it (e.g. S-polarized light), resultingly separating orthogonal, two linearly polarized light components with efficiency. The latter reflection layer 62b reflects one (S-polarized light, in the present case) of the linearly polarized light components reflected by the polarization separation layer 62a, thus bending the optical path. The reflection layer 62b can be replaced with a mirror evaporated with a metal film. By the above, the first linearly polarized light component passed through the polarization separation layer 62a, exits at a light-exit port OP1 provided close to the right-triangular prism while the second linearly polarized light component (S-polarized light, in the present case), reflected by the polarization separation layer 62a and reflection layer 62b, exits at a light-exit port OP2 provided close to the parallelogram prism. The wavelength plate 62d, arranged opposite to the light-exit port OP2, is a retardation element formed by a ½-wavelength plate. This converts the second linearly polarized light component (S-polarized light, in the present case), reflected upon the reflection layer 62b and exited from the parallelogram prism toward a direction of the system optical axis SA, into a first linearly polarized light component (i.e. P-polarized light) orthogonal to the same. As a result, the first polarization converter 61a efficiently converts the first source light LB which entered the light-incident port IPa into only a first linearly polarized light (P-polarized light, in the present case), thus allowing it to exit at the both light-exiting ports OP1, OP2'.

The second polarization converter 61b has the same structure as the first polarization converter 61a except for the difference in arrangement, and hence the detail is omitted to explain. The second polarization converter 61b efficiently converts the second source light LB which entered the light-incident port IPb into only a first linearly polarized light (P-polarized light), thus allowing it to exit toward the second light guide 71b.

The first light guide 71a is a light guide having a first rod 72a, a second rod 72b, a polarization separation layer 72d, a ¼-wavelength plate 72e and a reflection mirror 72f. The first rod 72a is a rod integrator in a quadrangular prism form that is formed of glass, plastic or the like. The first rod 72a has a light-incident port IP2 opposite to the light-exit ports OP1, OP2' of the first polarization converter 61a, thus having a light-exiting end face EF1 made in a state inclining 45 degrees relative to the system optical axis SA. The second rod 72b is also a rod integrator formed in a quadrangular prism form of glass, plastic or the like. The second rod 72b has a first end face EF2 opposite to the light-exiting end face EF1 of the first rod 72a. The end face EF2 is made in a state inclining 45 degrees relative to the system optical axis SA. The second rod 72b has a second end face EF3 opposite to the first end face EF2. The end face EF3 is made in a state orthogonal to the system optical axis SA.

The polarization separation layer 72d is inserted between the end face EF1 of the first rod 72a and the end face EF2 of the second rod 72b. The polarization separation layer 72b allows a first linearly polarized light component (P-polarized light, in the present case) of from the first polarization converter 61a to be passed but reflects a second linearly polarized light component orthogonal to it, resultingly separating orthogonal, two linearly polarized light components with efficiency. On the end face EF3 of the second rod 72b, there is bonded the ¼-wavelength plate 72e and reflection mirror 72f as a polarization switch means. This turns the first linearly polarized light which passed through the polarization separation layer 72d and reached the end face EF3 by propagating the second rods through the polarization separation layer 72d, back to the polarization separation layer 72d. Namely, by virtue of the reflection mirror 72f, incoming and outgoing passages are formed within the second rod 72b. Because the incoming and outgoing passages are provided with the ¼-wavelength plate 72e, the first linearly polarized light component (P-polarized light, in the present case) entered the end face EF2 of the second rods 72b is turned back by the end face EF3 so that it assumes a second linearly polarized light component (S-polarized light, in the present case) when exiting at the end face EF3. Because the polarization separation layer 72d is formed on the end face EF2 of the second rod 72b, the return light passed through the second rod 72b, i.e. second linearly polarized light component (S-polarized light, in the present case), is reflected upon the polarization separation layer 72d and enters the combination rod 78. Note that the ¼-wavelength plate 72e can be arranged in a proper position inside the second rod 72b without limited to the neighborhood of the reflection mirror 72f.

The second light guide 71b has the same structure as the first light guide 71a except for the difference in arrangement, and hence the detail is omitted to explain. The second light guide 71b, serving as light guide, allows the first source light LB of from the second polarization converter 61b to turn back in the second rod 72b through the first rod 72a and then reflect it upon the polarization separation layer 72d that is a polarization separation member, into the combination rod 78.

The combination rod 78 is a rod integrator formed in a quadrangular prism form of glass, plastic or the like. The combination rod 78 has an end face EF4 close to the first polarization separation film 72d provided on the first and second light guides 71a, 71b. Through the end face EF4, it is joined to the second rod 72b. The combination rod 78 extends in a direction orthogonal to the first and second rods 72a, 72b so that the second linearly polarized light component (S-polarization, in the present case), reflected by the polarization separation film 72d can exit as first illumination light LB2 at a light-exit port OP4.

Explaining the light action on the blue-light illuminator 21, the first source light LB generated at the first blue-light source unit 51a passes the first polarization converter 61a whereby it turns into a linearly polarized light in a particular direction, and travels in the first light guide 71a while being totally reflected upon the inner surface thereof. On this occasion, the first source light LB propagates, while being uniformized, in the first rod 72a on one way, in the second rod 72b on both ways, and in the combination rod 78 on one way, thus exiting as a linearly polarized light in a direction orthogonal to the former through the light-exit port OP4. Meanwhile, the first source light LB generated at the second blue-light source unit 51b passes the second polarization converter 61b whereby it turns into a linearly polarized light in a particular direction, and travels in the second light guide 71b while being totally reflected upon the inner surface thereof. On this occasion, the first source light LB propagates, while being uniformized, in the first rod 72a on one way, in the second rod 72b on both ways, and in the combination rod 78 on one way, thus exiting as a linearly polarized light in a direction orthogonal to the former through the light-exit port OP4. Namely, those of the first light LB generated at the first and second blue-light source units 51a, 51b are both uniformized while being converted into linearly polarized light, thus exiting as first illumination light LB2 quite uniform in polarization through the light-exit port OP4.

Referring back to FIG. 1, the green-light illuminator 23 has a pair of green-light source units 53a, 53b, a pair of polarization converters 63a, 63b, a pair of light guides 73a, 73b, and a combination rod 78. Of these, the green-light source units 53a, 53b have the similar structure as the blue-light source units 51a, 51b. However, each of the LEDs incorporated is to generate green light included in the category of green (G) of among three primary colors. The second source light LG, of such green light, passes the focus lens array, not shown, and enters superimposingly the polarization converter 63a, 63b at its light-incident port IPa, IPb freely from leakage. The polarization converters 63a, 63b have the similar structure to the FIG. 2 polarization converter 61a. The second source light LG passed through the polarization converter 63a, 63b has been efficiently converted into a single component of linearly polarized light by polarization separation, light-path bending and polarization switch, similarly to the case of the polarization converter 61a, 61b. It is introduced into a light guide 73a, 73b and then coupled to the combination rod 78. The second illumination light LG2 passed through the light guide 73a, 73b and combination rod 78 has been uniformized without encountering losses by the wave-front segmentation and superimposition through utilization of reflections upon the rod inner surface. This enters a green-light liquid-crystal display panel 33 of the light modulator 30 through a first polarization filter 26b arranged opposite to the light-exit port OP4 of the combination rod 78. Due to this, the illumination area on the liquid-crystal display panel 33 is illuminated uniform by polarized green light.

The red-light illuminator 25 has a pair of red-light source units 55a, 55b, a pair of polarization converters 65a, 65b, a pair of light guides 75a, 75b, and a combination rod 78. Of these, the red-light source units 55a, 55b have the similar structure as the blue-light source units 51a, 51b. However, each of the LEDs incorporated is to generate red light included in the category of red (R) of among three primary colors. The second source light LR of such red light passes the focus lens array, not shown, and enters superimposingly the polarization converter 65a, 65b at its light-incident port IPa, IPb freely from leakage. The polarization converters 65a, 65b have the similar structure to the FIG. 2 polarization converter 61a. The third source light LR passed through the polarization converter 65a, 65b has been efficiently converted into a single component of linearly polarized light by polarization separation, light-path bending and polarization switch, similarly to the case of the polarization converter 61a, 61b. It is introduced into a light guide 75a, 75b and then coupled to the combination rod 78. The third illumination light LR2, passed in the light guide 75a, 75b and combination rod 78, has been uniformized without encountering losses by the wave-front segmentation and superimposition through utilization of reflections upon the rod inner surface. This enters a red-light liquid-crystal display panel 35 of the light modulator 30 through a first polarization filter 26c arranged opposite to the light-exit port OP4 of the combination rod 78. Due to this, the illumination area on the liquid-crystal display panel 35 is illuminated uniform by polarized red light.

The liquid-crystal display panels 31, 33, 35 are light-transmission-type optical modulators. By switching the polarization direction of illuminated light on a pixel-by-pixel basis according to an image signal inputted from the external, modulation is made two-dimensionally on the illumination light inputted to the liquid-crystal display panel 31, 33, 35 from the color-light illuminator 21, 23, 25. First polarization filters 26a, 26b, 26c are arranged close to and opposite to the light-incident surfaces of the liquid-crystal display panels 31, 33, 35 so that the liquid-crystal display panels 31, 33, 35 can be illuminated by polarized light components enhanced in polarization degree. Meanwhile, second polarization filters 36a, 36b, 36c are arranged close to and opposite to the light-exit surfaces of the liquid-crystal display panels 31, 33, 35 so that reading is possible only on the polarized light component passed through each of the liquid-crystal display panels 31, 33, 35 and in a direction orthogonal to a particular direction. Here, the first polarization filter 26a, the liquid-crystal display panel 31 and the second polarization filter 36a constitute a blue-light liquid-crystal light valve. The first polarization filter 26b, the liquid-crystal display panel 33 and the second polarization filter 36b constitute a green-light liquid-crystal light valve. The first polarization filter 26c, the liquid-crystal display panel 35 and the second polarization filter 36c constitute a red-light liquid-crystal light valve. Namely, those of illumination light LB2, LG2, LR2, which entered the liquid-crystal display panel 31, 33, 35 from the color-light illuminator 21, 23, 25, are respectively intensity-modulated two-dimensionally by the liquid-crystal display panels 31, 33, 35. The respective colors of image light passed through the liquid-crystal display panels 31, 33, 35, are combined together by the cross-dichroic prism 37, or light-combining system, and then exits at one side surface thereof. The image of combined light, of from the cross-dichroic prism 37, enters a projection lens 40, or projection system, through which it is projected onto a screen (not shown) with a proper magnification ratio. Namely, the projector 10 projects an image combined with the respective colors (blue, green and red) of images formed on the liquid-crystal display panels 31, 33, 35, in the form of a moving or still image onto he screen.

Second Embodiment

Figure 4:
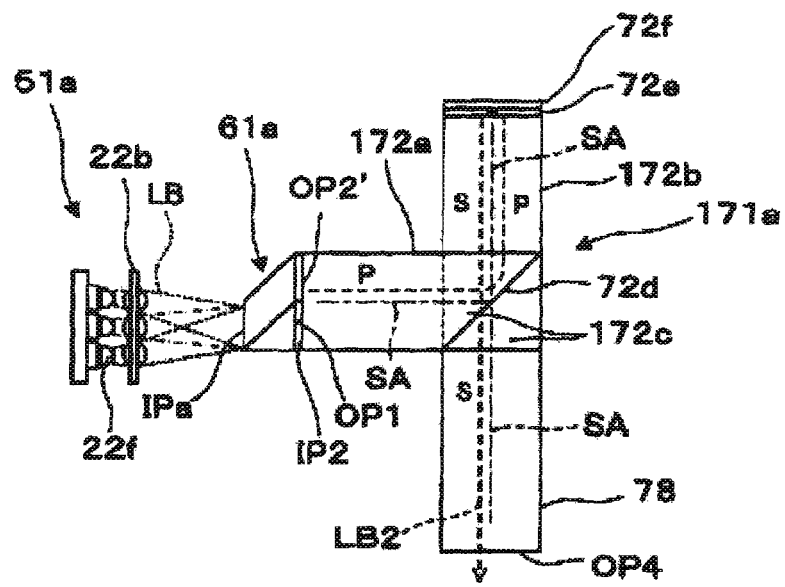
FIG. 4 is a view explaining a illuminator part of a projector in a second embodiment.

Referring now to FIG. 4, explanation is made on a second embodiment of the invention. The projector in the present embodiment is similar in basic structure to the first embodiment but different in the structure of an illuminator from the first embodiment.

A blue-light illuminator 21, shown in the figure, has a blue-light source unit 51a, a polarization converter 61a, a light guide 171a and a combination rod 78. Of these, the light guide 171a has a first rod 172a, a second rod 172b, a pair of prisms 172c, a polarization separation layer 72d, a ¼-wavelength plate 72e and a reflection mirror 72f. The polarization separation layer 72d is inserted as a polarization conversion member between the pair of prisms 172c provided close to the light-exit end of the first rod 172a, in a state inclining 45 degrees relative to the system optical axis SA. The second rod 172b extends in a direction orthogonal to the first rod 172a from the polarization separation layer 72d. The ¼-wavelength plate 72e and the reflection mirror 72f are bonded on an end face of the second rod 172b so that the linearly polarized light, reflected upon the polarization separation layer 72d and propagating the second rod 172b, can be turned back and converted into orthogonal, linearly polarized light, thus being returned to the polarization separation layer 72d. Namely, the light guide 171 allows the first source light LB, of from the polarization converter 61a, to turn back in the second rod 172b through the first rod 172a and then to transmit through the polarization separation layer 72d and enter the combination rod 78.

Incidentally, as for a uniformizer system formed by the blue-light source unit 51a, the polarization converter 61a and the light guide 171a, another uniformizer system having the equivalent function can be further provided so that the luminous fluxes of from the uniformizer systems 51a, 61a, 171a can be coupled together in the combination rod 78.

Although the explanations so far was on the blue-light illuminator 21, the green-light illuminator 23 or red-light illuminator 25 in FIG. 1 also has the same structure as the blue-light illuminator 21 in FIG. 4.

Third Embodiment

Figure 5:
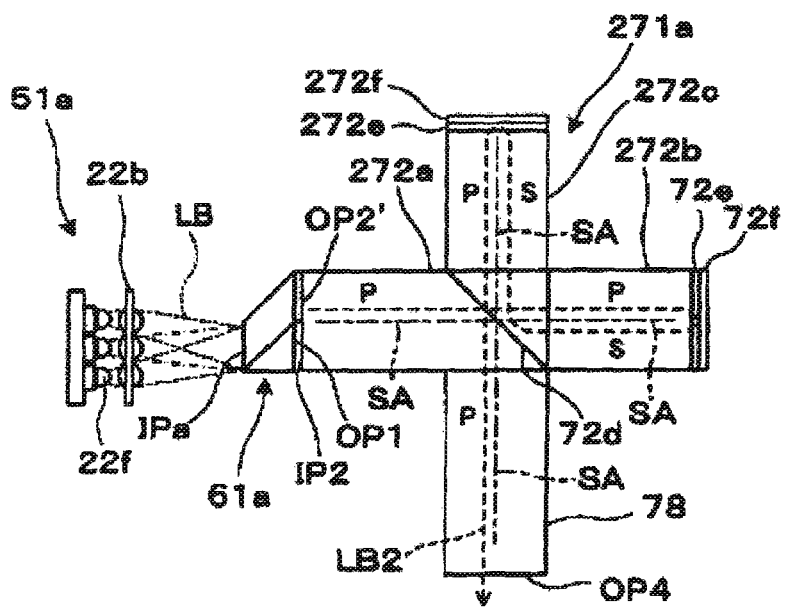
FIG. 5 is a view explaining a illuminator part of a projector in a third embodiment.

Referring now to FIG. 5, explanation is made on a third embodiment of the invention. The projector in the present embodiment is similar in basic structure to the first embodiment but different in the structure of an illuminator from the first embodiment.

A blue-light illuminator 21, shown in the figure, has a blue-light source unit 51a, a polarization converter 61a, a light guide 271a and a combination rod 78. Of these, the light guide 271a has a first rod 272a, a second rod 272b, a third rod 272c, a polarization separation layer 72d, ¼-wavelength plates 72e, 272e and reflection mirrors 72f, 272f. The polarization separation layer 72d is inserted as a polarization conversion member between first rod 272a and the second rod 272b, in a state inclining 45 degrees relative to the system optical axis SA. The third rod 272c extends in a direction orthogonal to the first and second rods 272a, 272b from the polarization separation layer 72d. The ¼-wavelength plate 72e and the reflection mirror 72f are bonded on an end face of the second rod 272b so that the linearly polarized light, transmitted through the polarization separation layer 72d and propagating the second rod 272b, can be converted into orthogonal, linearly polarized light while being turned back, thus being returned to the polarization separation layer 72d. Meanwhile, the ¼-wavelength plate 272e and the reflection mirror 272f are bonded on an end face of the third rod 272c so that the linearly polarized light, passed through the second rod 272b and reflected upon the polarization separation layer 72d and then propagating the third rod 72b, can be converted into orthogonal, linearly polarized light while being turned back, thus being returned to the polarization separation layer 72d. In this manner, the linearly polarized light, returned to the polarization separation layer 72d, transmits through the polarization separation layer 72d into the combination rod 78.

Incidentally, as for a uniformizer system formed by the blue-light source unit 51a, the polarization converter 61a and the light guide 271a, another uniformizer system having the equivalent function can be further provided so that the luminous fluxes of from the uniformizer systems 51a, 61a, 271a can be coupled together in the combination rod 78 similarly to the case in FIG. 2.

Although the foregoing was explained on the blue-light illuminator 21, the green-light and red-light illuminators 23, 25 in FIG. 1 have the similar structure to the FIG. 5 blue-light illuminator 21.

Fourth Embodiment

Figure 6:
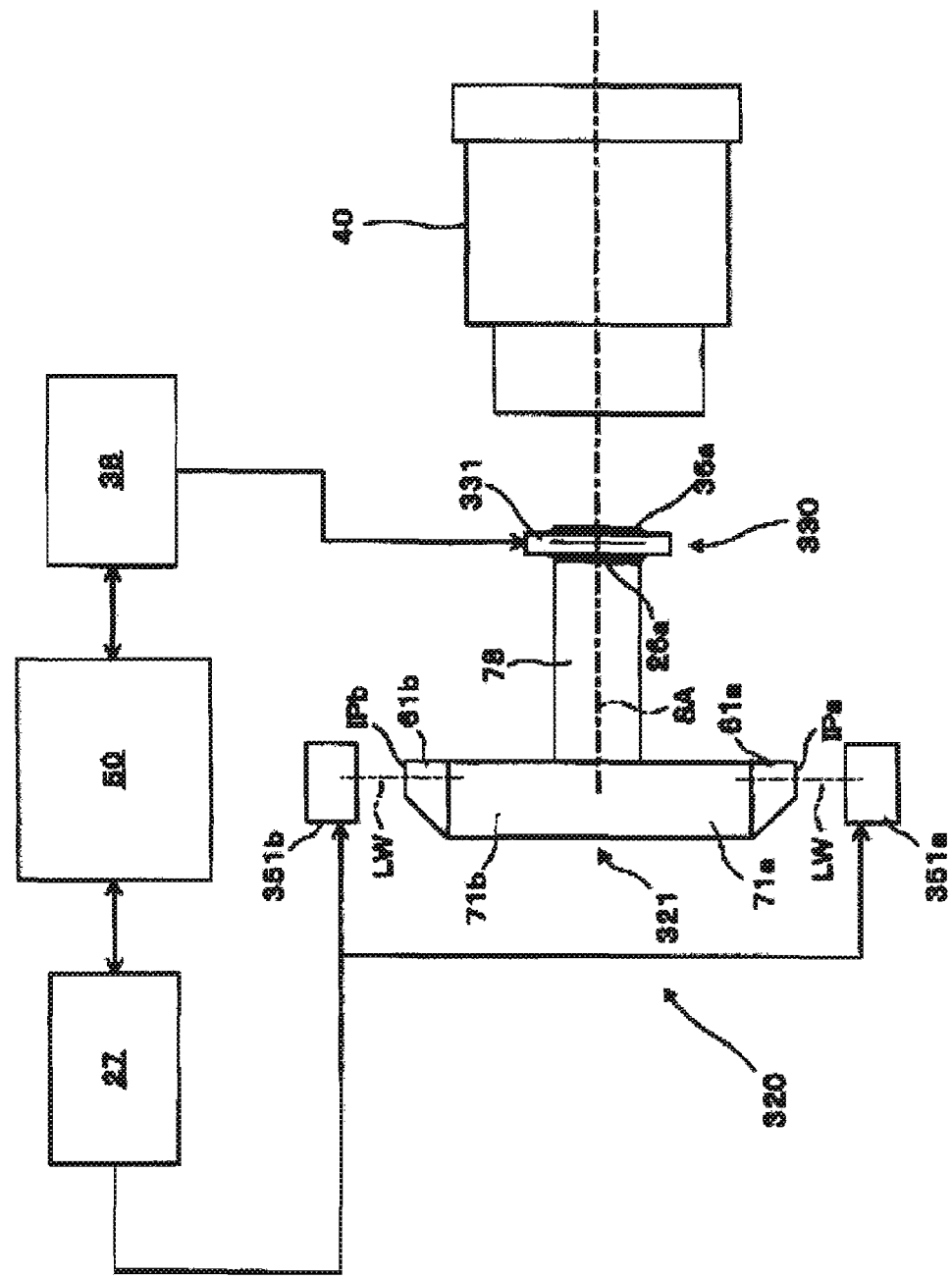
FIG. 6 is a view explaining a projector in a fourth embodiment.

Referring now to FIG. 6, explanation is made on a fourth embodiment. The projector in this embodiment is a proper modification to the projector 10 shown in FIG. 1 in respect of the illuminator 20, light modulator 30, etc. of the first embodiment, i.e. made in so-called a single-sheet type projector.

The projector 310 has an illuminator section 320, a light-modulator section 330 and a projection lens 40. Here, the illuminator section 320 has an illuminator 321 for generating source light nearly white and a light-source driver 27. Meanwhile, the light-modulator section 330 has a liquid-crystal display panel 331 that is a light modulator, and a device driver 38 for outputting a drive signal to the liquid-crystal display panel 331.

The illuminator 321 has a pair of white-light source units 351a, 351b, a pair of polarization modulators 61a, 61b, a pair of light guides 71a, 71b, and a combination rod 78. The white-light source units 351a, 351b are light sources to emit white source light LW. The polarization converters 61a, 61b are to convert source light LW into a particular polarized light component. The light guides 71a, 71b and the combination rod 78 are a uniformizer system to make source light LW uniform.

The white-light source unit 351a, 351b has the same structure as the FIG. 2 blue-light source unit 51a except for its specifications related to wavelength. Although detailed explanations are omitted, in the white-light source unit 351a, 351b, the while light from LEDs is collected by a focus lens array, to enter superimposedly, without encountering leakage, a light-incident port IPa, IPb provided in each of the polarization converters 61a, 61b. The polarization converter 61a, 61b and the light guide 71a, 71b are similar to those shown in FIGS. 1, 2, etc. and hence omitted to explain.

By virtue of the illuminator 321 as shown in the figure, those of source light LW generated by the white-light source units 351a, 351b are both made uniform while being converted into linearly polarized light, thus being emitted as extremely uniform polarized light to illuminate the liquid-crystal display panel 331 in its illumination area. The image light passed through the liquid-crystal display panel 331, enters the projection lens 40, or projection system, through which it is projected with a proper magnification ratio onto a screen (not shown). Namely, by the present projector 310, the image formed on the liquid-crystal display panel 331 is projected as a moving or still image onto the screen.

Although the present invention was explained so far by way of the embodiments, the invention is not to be limited to those embodiments. For example, although the embodiment performed light modulation by use of the liquid-crystal panels 31, 33, 35, light modulation can be done by using micro-mirror devices in place of the liquid-crystal panels 31, 33, 35.

Meanwhile, the polarization converters 61a, 61b, 63a, 63b, 65a, 65b are not limited to those exemplified but can use various structures of polarization converter means so long as linearly polarized light can be obtained from random polarized light or the like.

Meanwhile, the polarization separation layer 72d, incorporated in the light guide 71a, 71b, etc., can use an organic polarization film, a wire-grid polarizer or the like without limited to the dielectric multi-layer film.

Meanwhile, in the first embodiment, the illuminator section 20 is not limitedly made with the blue-light, green-light and red-light illuminators 21, 23, 25 but can be with two colors or more of illuminators using other wavelengths. In the color-light illuminators, by using a unit corresponding, to the color-light source units 51a, 51b, 53a, 53b, 55a, 55b and adapted for the wavelengths in use, desired illumination light is to be obtained.

What is claimed is:

1. An illuminator, comprising:
a polarization converter that converts source light into first polarized light;
a polarization separation member that separates the first polarized light from the polarization converter, and second polarized light that is different from the first polarized light, by reflection and transmission;
a polarization switch member that reflects the first polarized light that has passed the polarization separation member, and changes the reflected first polarized light into the second polarized light; and
a light guide having a first rod arranged between the polarization converter and the polarization separation member, a second rod arranged between the polarization separation member and the polarization switch member, and a third rod arranged on an optical path of the second polarized light that has been separated by the polarization separation member.

2. The illuminator according to claim 1, wherein the polarization converter and the polarization switch member are arranged, on a straight line, sandwiching the polarization separation member, the third rod extending in a direction orthogonal to the first and second rods that are arranged on a straight line from a position adjacent the polarization separation member.

3. The illuminator according to claim 1, wherein the polarization converter and the polarization switch member are arranged in orthogonal directions to each other sandwiching the polarization separation member, the third rod extending in an extending direction of the second rod from a position adjacent the polarization separation member.

4. The illuminator according to claim 1, wherein the polarization separator member is a polarization separation layer that is arranged inclining relative to an extending direction of the first rod, the polarization switch member having a mirror that causes a luminous flux corresponding to the first polarized light passed through the polarization separation layer to turn back within the second rod, and a retardation element that polarizes a luminous flux turning back within the second rod from the first polarized light into the second polarized light.

5. The illuminator according to claim 1, wherein the polarization converter has a polarization separation layer that separates source light that is random polarized light into first and second polarized light, and a retardation element that regulates a polarization direction of the second polarized light to a polarization direction of the first polarized light.

6. An illuminator, comprising:
a first polarization converter that converts first source light into first polarized light;
a first polarization separation member that separates the first polarized light from the first polarization converter, and second polarized light that is different from the first polarized light, by reflection and transmission;
a first polarization switch member that reflects the first polarized light that has passed through the first polarization separation member, and polarizes the reflected first polarized light into the second polarized light;
a first light guide having a first rod arranged between the first polarization converter and the first polarization separation member, and a second rod arranged between the first polarization separation member and the first polarization switch member;
a second polarization converter that converts second source light into first polarized light;
a second polarization separation member, that is arranged close to the first polarization switch member, for separating the first polarized light from the second polarization converter, and second polarized light that is different from the first polarized light, by reflection and transmission;
a second polarization switch member that reflects the first polarized light that has passed through the second polarization separation number, and polarizes the reflected first polarized light into the second polarized light;
a second light guide having a third rod arranged between the second polarization converter and the second polarization separation member, and a fourth rod arranged between the second polarization separation member and the second polarization switch member; and
a fifth rod arranged on an optical path of the second polarized light separated by the first and second polarization separation members.

7. A projector, comprising:
the illuminator according to claim 1;
a light modulator that modulates illumination light from the illuminator according to image information; and
a projection system that projects image light formed by the light modulator.

8. A projector, comprising:
the illuminator according to claim 1, that generates one color of light as illumination light;
at least one other illuminator according to claim 1 that generates at least one other color of light as illumination light that is different from the one color of light;
light modulators for respective colors that modulate respective colors of light from the illuminators for respective colors, according to image information;
a light combining system that combines together respective colors of image light modulated by the light modulators for respective colors and allows the modulated image light to exit; and
a projection system that projects image light combined through the light combining system.

* * * * *